United States Patent
Yong et al.

(10) Patent No.: US 11,544,181 B2
(45) Date of Patent: Jan. 3, 2023

(54) STORAGE DEVICE FOR MAPPING VIRTUAL STREAMS ONTO PHYSICAL STREAMS AND METHOD THEREOF

(71) Applicant: SAMSUNG ELECTRONICS CO., LTD., Suwon-si (KR)

(72) Inventors: Hwanjin Yong, Seoul (KR); Jin-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/243,795

(22) Filed: Jan. 9, 2019

(65) Prior Publication Data

US 2021/0232499 A1 Jul. 29, 2021

Related U.S. Application Data

(60) Provisional application No. 62/648,971, filed on Mar. 28, 2018.

(30) Foreign Application Priority Data

Jun. 1, 2018 (KR) .................. 10-2018-0063730

(51) Int. Cl.
*G06F 12/02* (2006.01)
*G06F 12/0882* (2016.01)
*G06F 13/16* (2006.01)

(52) U.S. Cl.
CPC ...... *G06F 12/0246* (2013.01); *G06F 12/0253* (2013.01); *G06F 12/0882* (2013.01); *G06F 13/1668* (2013.01); *G06F 2212/7201* (2013.01); *G06F 2212/7209* (2013.01)

(58) Field of Classification Search
CPC ............. G06F 12/0246; G06F 12/0253; G06F 12/0882; G06F 13/1668
See application file for complete search history.

(56) References Cited

U.S. PATENT DOCUMENTS

| | | | |
|---|---|---|---|
| 6,631,449 B1 * | 10/2003 | Borrill | G06F 12/0813 711/141 |
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,825,851 B2 | 9/2014 | Nayak et al. | |
| 8,918,844 B1 * | 12/2014 | Friedman | H04L 63/107 726/4 |
| 9,509,612 B1 | 11/2016 | Armorer et al. | |

(Continued)

FOREIGN PATENT DOCUMENTS

KR 101579941 B1 12/2015
KR 1020180026327 A 3/2018

*Primary Examiner* — Nanci N Wong
(74) *Attorney, Agent, or Firm* — Volentine, Whitt & Francos, PLLC

(57) ABSTRACT

A storage device includes a controller and nonvolatile memories. The controller receives write commands having virtual stream identifiers (IDs), receives discard commands having the virtual stream IDs, and determines a lifetime of write data to which each of the virtual stream IDs is assigned. The nonvolatile memories are accessed by the controller depending on physical stream IDs. The controller maps the virtual stream IDs and the physical stream IDs based on the lifetime of the write data.

17 Claims, 9 Drawing Sheets

(56) References Cited

U.S. PATENT DOCUMENTS

| | | |
|---|---|---|
| 2011/0233648 A1 | 9/2011 | Seol et al. |
| 2013/0135816 A1 | 5/2013 | Huang |
| 2015/0237140 A1 | 8/2015 | Murphy et al. |
| 2015/0293713 A1* | 10/2015 | Seo .................... G06F 12/0246 711/103 |
| 2016/0283125 A1 | 9/2016 | Hashimoto et al. |
| 2016/0313943 A1* | 10/2016 | Hashimoto ........... G06F 3/0608 |
| 2017/0075614 A1* | 3/2017 | Kanno ................. G06F 3/0679 |
| 2017/0153848 A1 | 6/2017 | Martineau et al. |
| 2017/0371585 A1* | 12/2017 | Lazo ....................... G06F 3/061 |
| 2018/0373431 A1* | 12/2018 | Kathawala ............ G06F 3/0619 |
| 2019/0034348 A1* | 1/2019 | Haswell .............. G06F 12/1009 |
| 2019/0205062 A1* | 7/2019 | Sun ....................... G06F 3/0679 |
| 2019/0303038 A1* | 10/2019 | Hubbard ............... G06F 3/0685 |

* cited by examiner

STORAGE DEVICE FOR MAPPING VIRTUAL STREAMS ONTO PHYSICAL STREAMS AND METHOD THEREOF

CROSS-REFERENCE TO RELATED APPLICATIONS

This application claims priority under 35 U.S.C. § 119 to U.S. Provisional Patent Application No. 62/648,971 filed on Mar. 28, 2018, in the U.S. Patent and Trademark Office and Korean Patent Application No. 10-2018-0063730 filed on Jun. 1, 2018, in the Korean Intellectual Property Office, the disclosures of which are incorporated by reference herein in their entireties.

BACKGROUND

Embodiments of the disclosure herein relate to a storage device and an operating method thereof, and more particularly, relate to a storage device for mapping virtual streams onto physical streams and an operating method thereof.

A storage device is a nonvolatile storage medium, and data stored in the storage device may be retained permanently or semi-permanently regardless of whether the storage device is powered. The storage device may operate electrically like a semiconductor memory, instead of operating mechanically. A storage device (e.g., a solid state drive (SSD)) including a semiconductor memory is mainly being used.

A host using the storage device may generate various kinds of data depending on applications. The host may provide information about data to the storage device together with the data for improving an operation of the storage device. However, information about data which the host may provide is restrictive due to a kind of the storage device, a limitation on hardware, etc.

SUMMARY

Embodiments of the disclosure provide a storage device for mapping virtual streams onto physical streams and an operating method thereof.

According to an exemplary embodiment, a storage device may include a controller that receives write commands having virtual stream identifiers (IDs), receives discard commands having the virtual stream IDs, and determines a lifetime of write data to which each of the virtual stream IDs is assigned. Nonvolatile memories are accessed by the controller depending on physical stream IDs. The controller may map the virtual stream IDs onto the physical stream IDs based on the lifetime of the write data.

According to an exemplary embodiment, a storage device may include nonvolatile memories and a controller. The controller accesses the nonvolatile memories depending on a first physical stream ID and a second physical stream ID. The controller may: (1) receive write commands having virtual stream IDs, (2) receive discard commands having the virtual stream IDs, (3) determine a lifetime of write data, to which each of the virtual stream IDs is assigned, based on the write commands and the discard commands, and (4) cluster the write data and one of first block data, to which the first physical stream ID is assigned, and second block data, to which the second physical stream ID is assigned. The clustering is based on a first difference between: (a) the lifetime of the write data and (b) a lifetime of the first block data and a second difference between: (c) the lifetime of the write data and (d) a lifetime of the second block data.

According to an exemplary embodiment, an operating method of a storage device may include: (1) receiving write commands having virtual stream IDs from a host, (2) receiving discard commands having the virtual stream IDs from the host, (3) determining a lifetime of write data, to which each of the virtual stream IDs is assigned, based on the write commands and the discard commands, (4) mapping the virtual stream IDs onto the physical stream IDs based on the lifetime of the write data, and (5) programming the write data to blocks, which correspond to one of the physical stream IDs, of nonvolatile memories, based on a mapping table indicating a relationship of the virtual stream IDs and the physical stream IDs.

According to an exemplary embodiment, a storage device includes a nonvolatile memory and a memory controller. The nonvolatile memory stores first data in a first memory block associated with a first period and stores second data in a second memory block associated with a second period. The memory controller: (1) generates a third period for storing third data received from a host, which is external to the storage device, with a write command, (2) stores the third data to the first memory block in response to determining the third period and first period are closer in value than are the third period and the second period, (3) stores the third data to the second memory block in response to determining the third period and second period are closer in value than are the third period and the first period, (4) executes a first garbage collection operation on the entirety of the first memory block after the expiration of the first period, and (5) executes a second garbage collection operation on the entirety of the second memory block after the expiration of the second period.

DETAILED DESCRIPTION

Below, embodiments of the disclosure will be described in detail and clearly to such an extent that an ordinary one in the art easily implements the disclosure.

Figure 1:
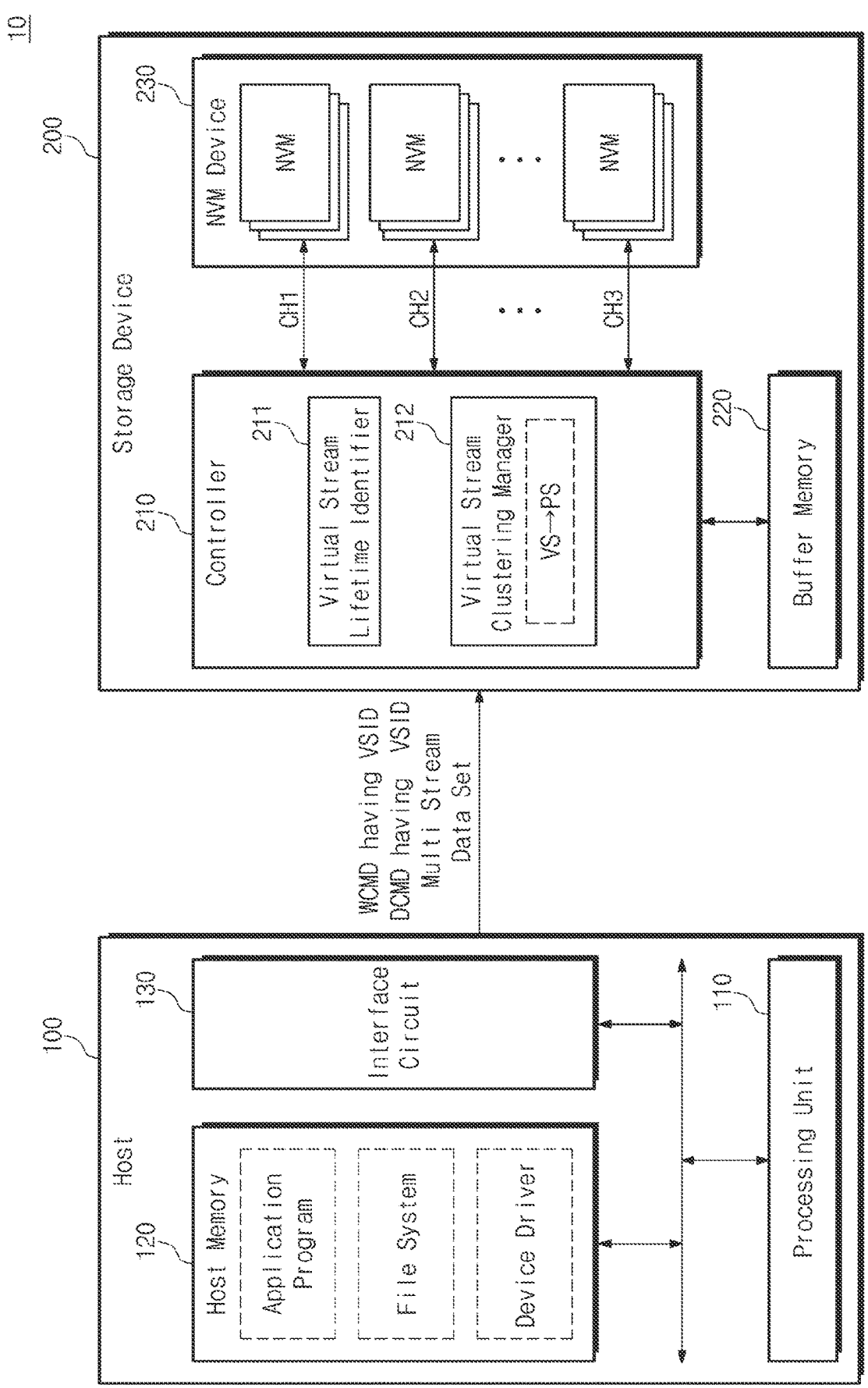
FIG. 1 is a block diagram illustrating a storage system according to an embodiment of the disclosure.

FIG. 1 is a block diagram illustrating a storage system according to an embodiment of the disclosure. A storage system 10 may include a host 100 and a storage device 200.

The host 100 may transmit data to the storage device 200 depending on a stream for storing the data to the storage device 200 (e.g., a solid state drive (SSD)). The host 100 may assign a stream identifier (ID) to the data depending on a type of data, such as a log file, a meta file, or a media file. For example, depending on a lifetime of a file, the log file may be referred to as "hot data", the meta file may be referred to as "warm data", and the media data may be referred to as "cold data". The host 100 may assign different stream IDs to a data set depending on a type of data, and may transmit a multi-stream data set to the storage device 200. For example, the host 100 may assign a stream ID #1 to data corresponding to the log file, and may assign a stream ID #2 to data corresponding to the media file. The host 100 may assign a stream ID to data such that hot data having a short lifetime and cold data having a long lifetime are not stored together at the same location (e.g., memory blocks) of the storage device 200 and may transmit data depending on a stream.

In an embodiment, the host 100 may respectively transmit a write command WCMD having a stream ID and a discard command DCMD having a stream ID to the storage device 200. The write command WCMD may be transmitted from the host 100 to the storage device 200 for programming data to the storage device 200. The discard command DCMD may be transmitted from the host 100 to the storage device 200 for indicating that data stored in the storage device 200 are invalid. For example, the discard command DCMD may be also referred to as a "trim command".

In an embodiment, the host 100 may transmit a multi-stream data set to the storage device 200 depending on streams (hereinafter referred to as "virtual streams") regardless of the number of streams (hereinafter referred to as "physical streams") which the storage device 200 may support due to a limitation on hardware or a hardware resource. For example, the host 100 may assign 65536 ($=2^{16}$) virtual stream IDs to the multi-stream data set depending on the size of a stream ID field assigned to the write command WCMD or the discard command DCMD. The number of virtual stream IDs which the host 100 may assign may be greater than the number of physical stream IDs which the storage device 200 may support. However, the number of virtual stream IDs which the host 100 may assign is not limited to the above exemplification. The term "multi-stream data set" is used to indicate a plurality of formats of data respectively corresponding to different virtual stream IDs, and the multi-stream data set may be referred to as "multiple data streams" or "a plurality of data streams".

The host 100 may include a processing unit 110, a host memory 120, and an interface circuit 130. The processing unit 110 may execute a variety of software (e.g., an application program, an operating system (e.g., file system), and a device driver) loaded onto the host memory 120. The processing unit 110 may execute an operating system (OS) or application programs. The processing unit 110 may include homogeneous multi-core processors or heterogeneous multi-core processors. For example, the processing unit 110 may include at least one of a central processing unit (CPU), an image signal processing unit (ISP), a digital signal processing unit (DSP), a graphics processing unit (GPU), a vision processing unit (VPU), and a neural processing unit (NPU).

An application program, a file system, a device driver, etc. may be loaded onto the host memory 120 for driving the storage system 10. Besides, a variety of software for driving the storage system 10 may be loaded onto the host memory 120. An application program or data to be processed by the processing unit 110 may be loaded onto the host memory 120. For example, an input/output scheduler (not illustrated) for managing a submission queue and a completion queue associated with commands to be transmitted to the storage device 200 may be loaded onto the host memory 120.

The interface circuit 130 may provide physical connections between the host 100 and the storage device 200. For example, the interface circuit 130 may convert (or translate) commands, addresses, and data, which correspond to various requests generated from the host 100, in a manner suitable for interfacing with the storage device 200. For example, the interface circuit 130 may be configured to communicate with the storage device 200 by using at least one of various communication manners, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), and an embedded MMC (eMMC).

The storage device 200 may process commands provided from the host 100. The storage device 200 may receive the write command WCMD having a virtual stream ID (VSID), the discard command DCMD having the virtual stream ID, and a multi-stream data set from the host 100. As described above, the host 100 may assign virtual stream IDs to a data set regardless of physical stream IDs which the storage device 200 may support. The number of physical stream IDs of the storage device 200 may be smaller than the number of virtual stream IDs of the host 100. Nevertheless, the storage device 200 may map virtual stream IDs onto (or and) physical stream IDs based on a characteristic of data, such as a lifetime, and may store a multi-stream data set based on a mapping result. The storage device 200 may include a controller 210, a buffer memory 220, and a nonvolatile memory device 230.

The controller 210 may include a virtual stream lifetime identifier 211, and a virtual stream clustering manager 212. The virtual stream lifetime identifier 211 may determine a lifetime of write data to which each of the virtual stream IDs is assigned, based on the write commands WCMD having virtual stream IDs and the discard commands DCMD having virtual stream IDs. For example, the virtual stream lifetime identifier 211 may be implemented with a circuit such as a field programmable gate array (FPGA) or an application specific integrated circuit (ASIC) or may be implemented with a processor or a combination of a processor and software executable by the processor.

The virtual stream clustering manager 212 may map virtual streams onto physical streams, based on the lifetime of the write data determined by the virtual stream lifetime identifier 211. In detail, the virtual stream clustering manager 212 may map virtual stream (VS) IDs onto physical stream (PS) IDs, based on the lifetime of the write data. For example, the virtual stream clustering manager 212 may be implemented with a circuit such as a FPGA or an ASIC or may be implemented with a processor or a combination of a processor and software executable by the processor. Also, the controller 210 including the virtual stream lifetime identifier 211 and the virtual stream clustering manager 212 may be implemented with a system on chip (SoC).

The buffer memory 220 may temporarily store data received from the host 100 or data received from the nonvolatile memory device 230. For example, the buffer memory 220 may store metadata such as a timestamp in which a lifetime of write data determined by the virtual stream lifetime identifier 211 is recorded, information for determining a lifetime, a mapping table indicating a relationship between virtual stream IDs and lifetimes, a mapping table which is generated by the virtual stream clustering manager 212 and indicates a relationship between virtual stream IDs and physical stream IDs, and a mapping table indicating a relationship between logical addresses (or logical block addresses LBA) of the host 100 and physical addresses of the nonvolatile memory device 230. The buffer memory 220 may include a volatile memory cell such as a dynamic random access memory (DRAM) cell or a static random access memory (SRAM) cell.

The nonvolatile memory device 230 may store the multi-stream data set under control of the controller 210. The nonvolatile memory device 230 may be accessed by the controller 210 depending on physical stream IDs. The nonvolatile memory device 230 may store data to which one physical stream ID is assigned and data to which another physical stream ID is assigned, to different regions (e.g., blocks).

The nonvolatile memory device 230 may include first nonvolatile memories (NVMs) communicating with the controller 210 through a first channel CH1, second nonvolatile memories communicating with the controller 210 through a second channel CH2, and third nonvolatile memories communicating with the controller 210 through a third channel CH3. The number of channels between the nonvolatile memory device 230 and the controller 210 is not limited to the example illustrated in FIG. 1. Each nonvolatile memory may include a nonvolatile memory cell such as a NAND flash memory cell, a NOR flash memory cell, a resistive random access memory (RRAM) cell, a ferroelectric random access memory (FRAM) cell, a phase change random access memory (PRAM) cell, a thyristor random access memory (TRAM) cell, or a magnetic random access memory (MRAM) cell. Below, a description will be given under the assumption that each of the first to third nonvolatile memory cells includes the NAND flash memory cell.

In an embodiment, the host 100 may transmit data of one virtual stream having the same characteristic or similar characteristics to the storage device 200. The host 100 may transmit a multi-stream data set of multiple virtual streams having different characteristics to the storage device 200. Here, the characteristics may include a lifetime of data. The host 100 may assign virtual stream IDs to a data set regardless of the number of physical stream IDs which the storage device 200 may support. The controller 210 may determine a lifetime of write data of a virtual stream. The controller 210 may assign virtual streams, the number of which is greater than the number of physical streams, to the physical streams based on lifetimes. That is, the controller 210 may map the virtual streams onto the physical streams based on the lifetimes.

In detail, the controller 210 may store a first data set of a first physical stream having first lifetimes, which are identical or similar to each other, to at least one first block of the nonvolatile memory device 230. The first data associated with a first period (e.g., the first lifetime) can be stored in the at least one first block. The controller 210 may store a second data set of a second physical stream having second lifetimes, which are identical or similar to each other, to at least one second block of the nonvolatile memory device 230. The second data associated with a second period (e.g., the second lifetime) can be stored in the at least one second block. Here, a block may include memory cells corresponding to an erase unit of the nonvolatile memory device 230. As described above, the first lifetimes are identical or similar to each other, and the second lifetimes are identical or similar to each other. In contrast, the first lifetimes may be different from the second lifetimes. In the case where a time corresponding to the first lifetimes elapses, the first data set stored in the first block may be together erased. In the case where a time corresponding to the second lifetimes elapses, the second data set stored in the second block may be together erased. That is, the controller 210 may not store a data set having different lifetimes to the same block, based on physical streams.

The controller 210 may store a data set of different physical streams to different blocks and may manage the data set. According to the above-described operation of the controller 210, the efficiency of garbage collection for erasing invalid data in block or pages and gaining free pages may be improved. Also, even though the host 100 assigns a lot of virtual stream IDs to a data set, the controller 210 may store a data set of virtual streams having the same lifetime or similar lifetimes to the same block. Since the host 100 may transmit a data set of virtual streams to the storage device 200 regardless of the number of physical streams of the storage device 200, the portability or compatibility of the host 100 may be improved.

Figure 2:
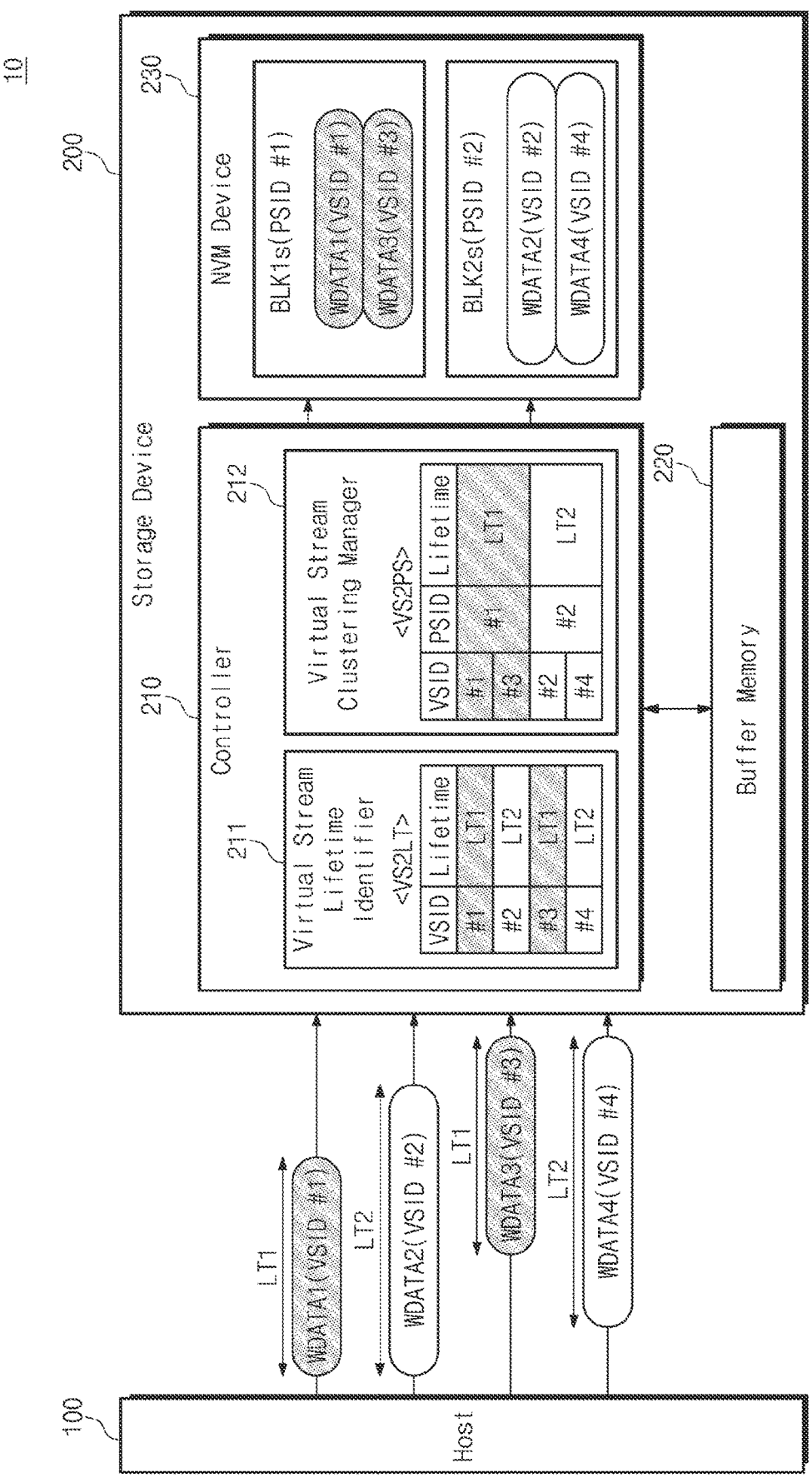
FIG. 2 is a diagram illustrating mapping of virtual streams of a host onto physical streams of a storage device, according to an embodiment of the disclosure.

FIG. 2 is a diagram illustrating mapping of virtual streams of a host onto physical streams of a storage device, according to an embodiment of the disclosure. The host 100 may transmit first to fourth write data WDATA1 to WDATA4, to which first to fourth virtual stream IDs VSID #1 to VSID #4 are respectively assigned, to the storage device 200. However, the number of virtual streams of the host 100 is not limited to the example illustrated in FIG. 2. The storage device 200 may support first and second physical streams, the number of which is smaller than the number of first to fourth virtual streams. However, the number of physical streams which the storage device 200 supports is not limited to the example illustrated in FIG. 2.

The host 100 may transmit write commands respectively having the first to fourth virtual stream IDs VSID #1 to VSID #4 to the storage device 200. The host 100 may transmit discard commands respectively having the first to fourth virtual stream IDs VSID #1 to VSID #4 to the storage device 200. The host 100 may transmit overwrite commands respectively having the first to fourth virtual stream IDs VSID #1 to VSID #4 to the storage device 200. Here, the overwrite command may be a write command having a logical address range included in a previous write command. That is, the overwrite command is also the write command.

Lifetimes of the first to fourth write data WDATA1 to WDATA4 may be determined depending on the above-described commands transmitted from the host 100. For example, the lifetimes of the first and third write data WDATA1 and WDATA3 may be identically LT1, and the lifetimes of the second and fourth write data WDATA2 and WDATA4 may be identically LT2. Each of lengths of the first to fourth write data WDATA1 to WDATA4 illustrated in FIG. 2 may indicate a lifetime. However, the lifetimes of the first to fourth write data WDATA1 to WDATA4 are not limited to the example illustrated in FIG. 2.

The virtual stream lifetime identifier 211 may determine lifetimes of the first to fourth write data WDATA1 to WDATA4 based on the write commands, the overwrite commands, and the discard commands associated with first to fourth virtual streams. For example, the virtual stream lifetime identifier 211 may generate a mapping table VS2LT indicating a relationship of the first to fourth virtual stream IDs VSID #1 to VSID #4 and lifetimes of the first to fourth write data WDATA1 to WDATA4, and may store the mapping table VS2LT to the buffer memory 220. Of course, the size of the mapping table VS2LT may be changed depending on the number of virtual streams generated by the host 100.

The virtual stream clustering manager 212 may map the first to fourth virtual streams onto first and second physical streams, based on the mapping table VS2LT associated with lifetimes of virtual streams. For example, the virtual stream clustering manager 212 may generate a mapping table VS2PS indicating a relationship of virtual stream IDs and physical stream IDs and may store the mapping table VS2PS to the buffer memory 220. Also, referring to FIG. 2, the mapping table VS2PS may further indicate a relationship between physical stream IDs and lifetimes of write data to which the physical stream IDs are assigned. Of course, the size of the mapping table VS2PS may be changed depending on the number of virtual streams generated by the host 100.

The virtual stream clustering manager 212 may assign the first and third virtual streams having the same lifetime LT1 to the first physical stream. The virtual stream clustering manager 212 may assign the first and third virtual stream IDs VSID #1 and VSID #3 to a first physical stream ID PSID #1. The virtual stream clustering manager 212 may cluster or group the first write data WDATA1 to which the first virtual stream ID VSID #1 is assigned and the third write data WDATA3 to which the third virtual stream ID VSID #3 is assigned.

As in the above description, the virtual stream clustering manager 212 may assign the second and fourth virtual streams having the same lifetime LT2 to the second physical stream. The virtual stream clustering manager 212 may assign the second and fourth virtual stream IDs VSID #2 and VSID #4 to a second physical stream ID PSID #2. The virtual stream clustering manager 212 may cluster the second write data WDATA2 to which the second virtual stream ID VSID #2 is assigned and the fourth write data WDATA4 to which the fourth virtual stream ID VSID #4 is assigned.

The controller 210 may program each of the first to fourth write data WDATA1 to WDATA4 to blocks of the nonvolatile memory device 230 corresponding to any one of the first and second physical stream IDs PSID #1 and PSID #2, based on the mapping table VS2PS. For example, the controller 210 may program the first and third write data WDATA1 and WDATA3 to first blocks BLK1s corresponding to the first physical stream ID PSID #1. As in the above description, the controller 210 may program the second and fourth write data WDATA2 and WDATA4 to second blocks BLK2s corresponding to the second physical stream ID PSID #2. Write data programmed to blocks may be referred to as "block data".

After programming, when the first and third write data WDATA1 and WDATA3 are invalidated by the discard commands or the overwrite commands and the lifetime LT1 elapses, the controller 210 may erase the first blocks BLK1s. As in the above description, when the second and fourth write data WDATA2 and WDATA4 are invalidated by the discard commands or the overwrite commands and the lifetime LT2 elapses, the controller 210 may erase the second blocks BLK2s. In the case where write data are invalidated by the discard commands or the overwrite commands of the host 100, since the invalidated data are old data, the host 100 may not request the invalidated data from the controller 210 anymore, and the controller 210 may erase the invalidated data when the lifetime of the invalidated data elapses.

Unlike the illustration of FIG. 2, the first and third write data WDATA1 and WDATA3 may have not the same lifetime but similar lifetimes, and the second and fourth write data WDATA2 and WDATA4 may have not the same lifetime but similar lifetimes. Even in this case, the first and third virtual stream IDs VSID #1 and VSID #3 may be mapped onto the first physical stream ID PSID #1 by the virtual stream clustering manager 212, and the second and fourth virtual stream IDs VSID #2 and VSID #4 may be mapped onto the second physical stream ID PSID #2 by the virtual stream clustering manager 212.

Figure 3:
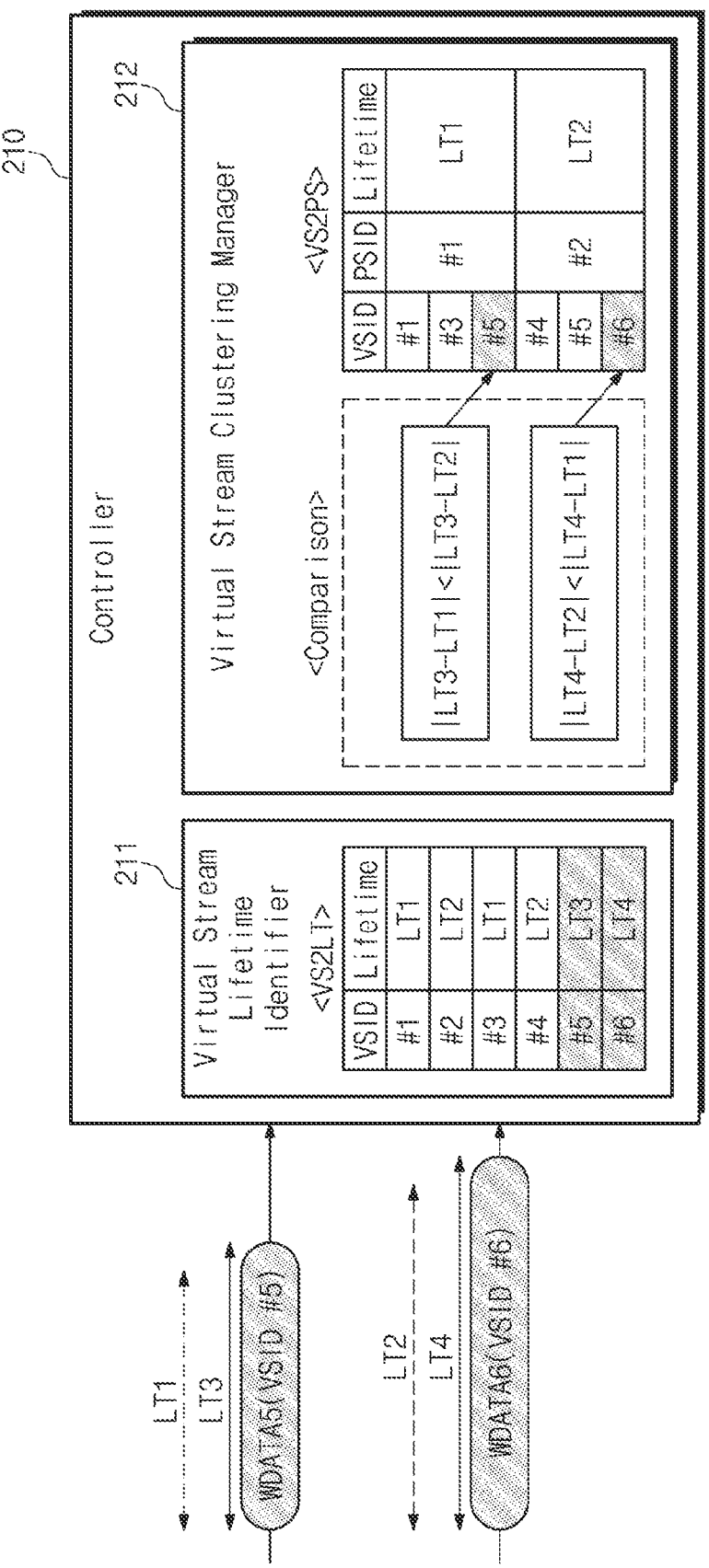
FIG. 3 is a diagram illustrating mapping of virtual streams of a host onto physical streams of a storage device, according to another embodiment of the disclosure.

FIG. 3 is a diagram illustrating mapping of virtual streams of a host and physical streams of a storage device, according to another embodiment of the disclosure. FIG. 3 will be described with reference to FIG. 2. For brevity of description, only the controller 210, the virtual stream lifetime identifier 211, and the virtual stream clustering manager 212 are illustrated in FIG. 3.

First, as described with reference to FIG. 2, the first to fourth virtual streams may be mapped onto the first and second physical streams, and the first to fourth write data WDATA1 to WDATA4 may be stored or programmed to the first blocks BLK1s and the second blocks BLK2s. Next, in FIG. 3, it is assumed that the host 100 transmits fifth and sixth write data WDATA5 and WDATA6, to which fifth and sixth virtual stream IDs VSID #5 and VSID #6 are respectively assigned, to the storage device 200. Also, it is assumed that a lifetime of the fifth write data WDATA5 is LT3 similar to LT1 being the lifetimes of the first and third write data WDATA1 and WDATA3 and lifetime of the sixth write data WDATA6 is LT4 similar to LT2 being the lifetimes of the second and fourth write data WDATA2 and WDATA4.

The virtual stream lifetime identifier 211 may further determine the lifetimes of the fifth and sixth write data WDATA5 and WDATA6 based on the write commands, the overwrite commands, and the discard commands associated with fifth and sixth virtual streams. For example, the virtual stream lifetime identifier 211 may further add a relationship of the fifth and sixth virtual stream IDs VSID #5 and VSID #6 and the lifetimes of the fifth and sixth write data WDATA5 and WDATA6 to the mapping table VS2LT. The virtual stream lifetime identifier 211 may update the mapping table VS2LT and may store the updated mapping table VS2LT to the buffer memory 220.

The virtual stream clustering manager 212 may compare the lifetime LT3 of the fifth virtual stream with each of the lifetimes LT1 and LT2 of the first and second physical streams. The virtual stream clustering manager 212 may compare the lifetime LT3 of the fifth virtual stream with the lifetime of block data to which each of the first and second physical stream IDs is assigned. As in the above description, the virtual stream clustering manager 212 may compare the lifetime LT4 of the sixth virtual stream with each of the lifetimes LT1 and LT2 of the first and second physical streams. The virtual stream clustering manager 212 may compare the lifetime LT4 of the sixth write data WDATA6 with the lifetime of block data to which each of the first and second physical stream IDs is assigned.

The virtual stream clustering manager 212 may assign each of the fifth and sixth virtual streams to the first or second physical streams based on a comparison result. The virtual stream clustering manager 212 may assign each of the fifth and sixth virtual stream IDs to the first or second physical stream IDs based on the comparison result. In the case where the number of physical streams which the storage device 200 supports is "n" (n being an integer of 2 or more), the virtual stream clustering manager 212 may assign each of the fifth and sixth virtual streams to any one of "n" physical streams, based on the comparison result. The virtual stream clustering manager 212 may map each of the fifth and sixth virtual stream IDs and any one of the "n" physical stream IDs based on the comparison result.

The virtual stream clustering manager 212 may determine whether a difference between the lifetime LT3 of the fifth write data WDATA5 of the fifth virtual stream and the lifetime of the block data to which the first physical stream ID is assigned is smaller than a difference between the lifetime LT3 of the fifth write data WDATA5 of the fifth virtual stream and the lifetime of the block data to which the second physical stream ID is assigned. Here, the difference may be an absolute value. The lifetime of the block data may be a lifetime of data stored or programmed to blocks corresponding to a physical stream ID or an average of lifetimes of a data set stored therein. According to the above-described assumption, since the first and third write data WDATA1 and WDATA3 are programmed to blocks to which the first physical stream ID is assigned, a lifetime of a data set programmed to the blocks to which the first physical stream ID is assigned is LT1. Since the second and fourth write data WDATA2 and WDATA4 are programmed to blocks to which the second physical stream ID is assigned, a lifetime of a data set programmed to the blocks to which the second physical stream ID is assigned is LT2. The lifetime LT3 is similar to the lifetime LT1 and is different from the lifetime LT2. A difference between the lifetime LT3 and the lifetime LT1 is smaller than a difference between the lifetime LT3 and the lifetime LT2.

Accordingly, the virtual stream clustering manager 212 may assign the fifth virtual stream to not the second physical stream but the first physical stream depending on the smaller lifetime difference, and may map the fifth virtual stream ID onto the first physical stream ID PSID #1. As in the above description, the virtual stream clustering manager 212 may assign the sixth virtual stream to not the first physical stream but the second physical stream depending on the smaller lifetime difference, and may map the sixth virtual stream ID onto the second physical stream ID PSID #2. The virtual stream clustering manager 212 may update the mapping table VS2PS and may store the updated mapping table VS2PS to the buffer memory 220.

After the above-described mapping operation, the virtual stream clustering manager 212 may cluster the first write data WDATA1 to which the first virtual stream ID VSID #1 is assigned, the third write data WDATA3 to which the third virtual stream ID VSID #3 is assigned, and the fifth write data WDATA5 to which the fifth virtual stream ID VSID #5 is assigned. According to the above-described assumption, since the first write data WDATA1 and the third write data WDATA3 are programmed to the first blocks BLK1s, the first write data WDATA1 and the third write data WDATA3 may be referred to as "block data". As in the above description, after the above-described mapping operation, the virtual stream clustering manager 212 may cluster the second write data WDATA2 to which the second virtual stream ID VSID #2 is assigned, the fourth write data WDATA4 to which the fourth virtual stream ID VSID #4 is assigned, and the sixth write data WDATA6 to which the sixth virtual stream ID VSID #6 is assigned. According to the above-described assumption, since the second write data WDATA2 and the fourth write data WDATA4 are programmed to the second blocks BLK2s, the second write data WDATA2 and the fourth write data WDATA4 may be referred to as "block data". The virtual stream clustering manager 212 may determine a difference between a lifetime of write data and a lifetime of block data to which physical stream IDs are respectively assigned, and may cluster the write data and the block data based on the difference.

In an embodiment, the virtual stream clustering manager 212 may update the mapping table VS2PS whenever a reference time (e.g., ten minutes) elapses. In another embodiment, the virtual stream clustering manager 212 may update the mapping table VS2PS whenever the number of discard commands received exceeds a reference value.

In an embodiment, the number of physical streams which the storage device 200 supports may be "n" (n being an integer of 2 or more). In this case, the virtual stream clustering manager 212 may determine whether any one of differences between a lifetime of write data of any virtual stream and lifetimes of a block data set to which first to n-th physical stream IDs are assigned is the smallest. The virtual stream clustering manager 212 may map virtual streams onto physical streams depending on the smallest difference. For example, the virtual stream clustering manager 212 may map virtual streams onto physical streams based on a K-means clustering algorithm.

In an embodiment, after the fifth and sixth virtual streams are mapped onto the first and second physical streams, the virtual stream clustering manager 212 may perform a comparison operation on write data of a new virtual stream. In this case, the virtual stream clustering manager 212 may compare an average of lifetimes of the first block data (i.e., the first, third, and fifth write data WDATA1, WDATA3, and WDATA5), to which the first physical stream ID is assigned, with a lifetime of the write data of the new virtual stream. As in the above description, the virtual stream clustering manager 212 may compare an average of lifetimes of the second block data (i.e., the second, fourth, and sixth write data WDATA2, WDATA4, and WDATA6), to which the second physical stream ID is assigned, with the lifetime of the write data of the new virtual stream. The virtual stream clustering manager 212 may update the average of the lifetimes of the first block data, to which the first physical stream ID is assigned, with a lifetime of the first physical stream in the mapping table VS2PS. As in the above description, the virtual stream clustering manager 212 may update the average of the lifetimes of the second block data, to which the second physical stream ID is assigned, with a lifetime of the second physical stream in the mapping table VS2PS.

Figure 4:
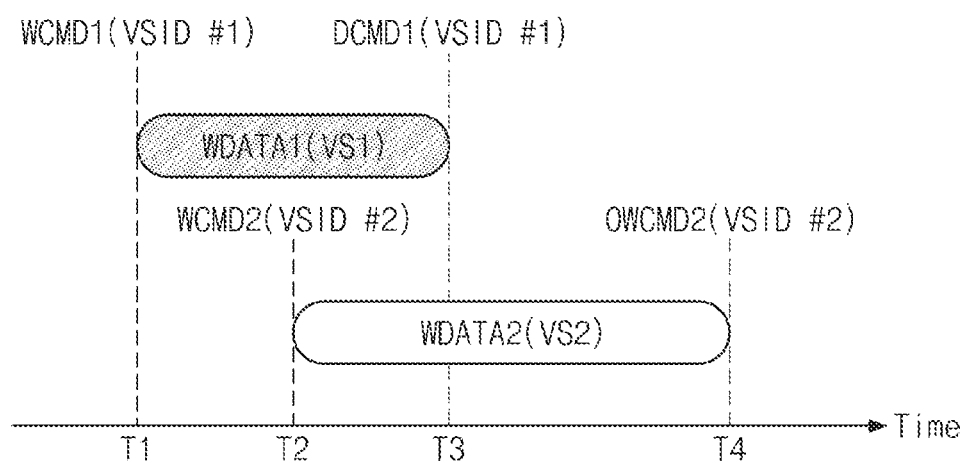
FIGS. 4 and 5 are diagrams illustrating an operation in which a virtual stream lifetime identifier according to an embodiment of the disclosure determines a lifetime of write data.
Figure 5:
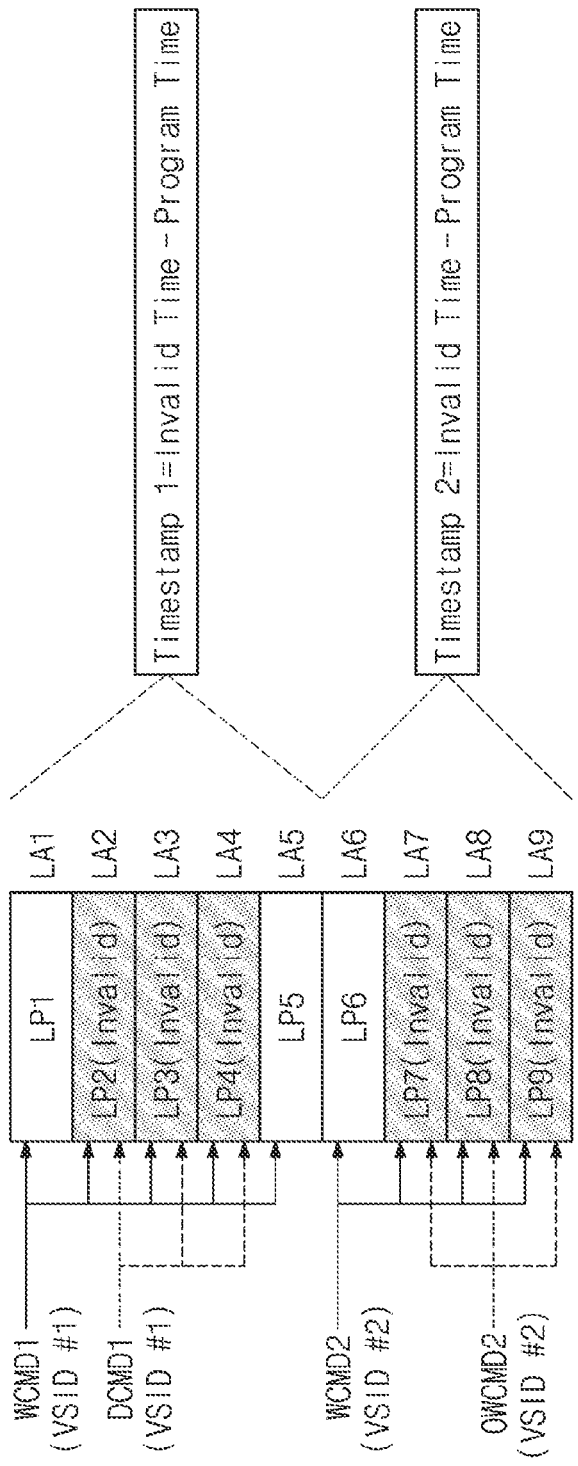

FIGS. 4 and 5 are diagrams illustrating an operation in which a virtual stream lifetime identifier according to an embodiment of the disclosure determines a lifetime of write data. FIGS. 4 and 5 will be described together, and will be described with reference to FIGS. 1 to 3.

Referring to FIG. 4, at a first time T1, the controller 210 may receive a first write command WCMD1 for the first write data WDATA1 of the first virtual stream. At a second time T2, the controller 210 may receive a second write command WCMD2 for the second write data WDATA2 of the second virtual stream. At a third time T3, the controller 210 may receive a first discard command DCMD1 for the first write data WDATA1 of the first virtual stream. At a fourth time T4, the controller 210 may receive a second overwrite command OWCMD2 for the second write data WDATA2 of the second virtual stream. Here, the host 100 may generate a write command and a discard command such that a virtual stream ID is included in both the write command and the discard command, and the controller 210 may receive the write and discard commands thus generated. Unlike the illustration of FIG. 4, the controller 210 may receive the first discard command DCMD1 and then may receive the second write command WCMD2.

In an embodiment, the virtual stream lifetime identifier 211 may determine a lifetime of the first write data WDATA1 based on a difference between the time T3 at which the first discard command DCMD1 is received and the time T1 at which the first write command WCMD1 is received. The virtual stream lifetime identifier 211 may calculate the difference between the time T3 and the time T1 as the lifetime of the first write data WDATA1.

In another embodiment, the virtual stream lifetime identifier 211 may determine a lifetime of the first write data WDATA1 based on a difference between the time T3 at which the first discard command DCMD1 is received and a time after the time T1 at which the first write data WDATA1 are programmed to the nonvolatile memory device 230 depending on the first write command WCMD1. The virtual stream lifetime identifier 211 may calculate the difference between the time (an invalid time) T3 and the time at which the first write data WDATA1 are programmed to the nonvolatile memory device 230, as the lifetime of the first write data WDATA1.

As in the above description, the virtual stream lifetime identifier 211 may calculate a lifetime of the second write data WDATA2. However, the virtual stream lifetime identifier 211 may calculate the lifetime of the second write data WDATA2 based on the second overwrite command OWCMD2 instead of a discard command. As described above, the second overwrite command OWCMD2 is a write command having a logical address range overlapping with a logical address range of the second write command WCMD2 received at the time T2.

A write command and a discard command generated by the host 100 may include information (e.g., a start logical address and a sector count) about a logical address range as well as a virtual stream ID. The write command and the discard command may include a field for a virtual stream ID and a field for a logical address range.

Referring to FIG. 5, the first write command WCMD1 may include first to fifth logical addresses LA1 to LA5 indicating first to fifth logical pages LP1 to LP5, respectively. That is, the first write data WDATA1 may be divided into the first to fifth logical pages LP1 to LP5 and may be stored to the first to fifth logical pages LP1 to LP5. The first discard command DCMD1 may include the second to fourth logical addresses LA2 to LA4 indicating the second to forth logical pages LP2 to LP4, respectively. The controller 210 may mark that the second to fourth logical pages LP2 to LP4 indicated by the second to fourth logical addresses LA2 to LA4 are invalidated in a mapping table LA2PA (not illustrated) indicating a relationship between logical addresses and physical addresses, based on the first discard command DCMD1. However, a logical address range included in the first write command WCMD1 may be identical to or different from a logical address range included in the first discard command DCMD1, and the logical address ranges are not limited to the example illustrated in FIG. 5.

The second write command WCMD2 may include sixth to ninth logical addresses LA6 to LA9 indicating sixth to ninth logical pages LP6 to LP9, respectively. That is, the second write data WDATA2 may be divided into the sixth to ninth logical pages LP6 to LP9 and may be stored to the sixth to ninth logical pages LP6 to LP9. The second overwrite command OWCMD2 may include the seventh to ninth logical addresses LA7 to LA9 indicating the seventh to ninth logical pages LP7 to LP9, respectively. The controller 210 may mark that the seventh to ninth logical pages LP7 to LP9 indicated by the seventh to ninth logical addresses LA7 to LA9 are invalidated in a mapping table (not illustrated) indicating a relationship between logical addresses and physical addresses, based on the second overwrite command OWCMD2. However, a logical address range included in the second write command WCMD2 may be identical to or different from a logical address range included in the second overwrite command OWCMD2, and the logical address ranges are not limited to the example illustrated in FIG. 5.

Referring to FIG. 5, the virtual stream lifetime identifier 211 may generate a first timestamp in which the lifetime of the first write data WDATA1 of the first virtual stream is recorded. The virtual stream lifetime identifier 211 may generate a second timestamp in which the lifetime of the second write data WDATA2 of the second virtual stream is recorded. A difference between a time at which the first write data WDATA1 are invalidated by the first discard command DCMD1 and a time at which the first write data WDATA1 are programmed to the nonvolatile memory device 230 may be recorded in the first timestamp. A difference between a time at which the second write data WDATA2 are invalidated by the second overwrite command OWCMD2 and a time at which the second write data WDATA2 are programmed to the nonvolatile memory device 230 may be recorded in the second timestamp.

In an embodiment, the controller 210 may program the first to fifth logical pages LP1 to LP5 of the first virtual stream to the nonvolatile memory device 230 at the same time, not at different times. Accordingly, the virtual stream lifetime identifier 211 may not store or manage times at which the first to fifth logical pages LP1 to LP5 are respectively programmed to the nonvolatile memory device 230. Instead, the virtual stream lifetime identifier 211 may calculate and manage only any one time at which the first to fifth logical pages LP1 to LP5 are simultaneously programmed to the nonvolatile memory device 230.

As in the above description, the controller 210 may simultaneously program the sixth to ninth logical pages LP6 to LP9 of the second virtual stream to the nonvolatile memory device 230. Accordingly, the virtual stream lifetime identifier 211 may calculate and manage only any one time at which the sixth to ninth logical pages LP6 to LP9 are simultaneously programmed to the nonvolatile memory device 230. Here, the time at which the first write data WDATA1 are programmed to the nonvolatile memory device 230 may be identical to or different from the time at which when the second write data WDATA2 are programmed to the nonvolatile memory device 230.

In the case where the virtual stream lifetime identifier 211 generates and manages timestamps of respective logical pages, the size of a table of the timestamps may be identical to the size of a mapping table indicating a relationship between logical addresses and physical addresses. It may be inefficient to store and manage the timestamp table, the size of which is identical to the size of the mapping table, to the buffer memory 220. Since the controller 210 may simultaneously program a plurality of logical pages to the nonvolatile memory device 230, the virtual stream lifetime identifier 211 need not generate and manage timestamps based on (respective) program times of the logical pages.

In an embodiment, for reducing the size of the timestamp table, the virtual stream lifetime identifier 211 may adjust the size of the timestamp table depending on the number of logical pages simultaneously programmed to the nonvolatile memory device 230, and may store the timestamp table of the adjusted size to the buffer memory 220. Here, the number of logical pages simultaneously programmed to the nonvolatile memory device 230 may be determined, for example, depending on the number of channels for connecting the nonvolatile memory device 230 and the controller 210, the number of ways connected to each of the channels, the number of planes of each of the nonvolatile memories, or a ratio of the size of a physical page of each of the nonvolatile memories to the size of a logical page. The channel, the way, and the size of the page will be described with reference to FIG. 7.

In another embodiment, the virtual stream lifetime identifier 211 may calculate invalid times of the second to fourth logical pages LP2 to LP4 (i.e., dead pages or invalid pages), which are specified by the first discard command DCMD1, from among the first to fifth logical pages LP1 to LP5 to which the first write data WDATA1 are stored, and an average of the invalid times. The average of the invalid times of the dead pages may be an invalid time of a virtual stream. The virtual stream lifetime identifier 211 may not calculate lifetimes of live pages (i.e., the first and fifth logical pages LP1 and LP5) of the first to fifth logical pages LP1 to LP5, but instead may calculate lifetimes of the dead pages. According to the above-described manner, the throughput of the virtual stream lifetime identifier 211 may be reduced.

As in the above description, the virtual stream lifetime identifier 211 may calculate invalid times of the seventh to ninth logical pages LP7 to LP9, which are specified by the second overwrite command OWCMD2, from among the sixth to ninth logical pages LP6 to LP9 to which the second write data WDATA2 are stored, and an average of the invalid times. To sum up, the virtual stream lifetime identifier 211 may determine lifetimes associated with logical pages of logical addresses included in both a write command and one of a discard command and an overwrite command and may determine a lifetime of write data by calculating an average of the lifetimes. The virtual stream lifetime identifier 211 may repeatedly determine lifetimes of dead pages whenever a discard command or an overwrite command is received.

Figure 6:
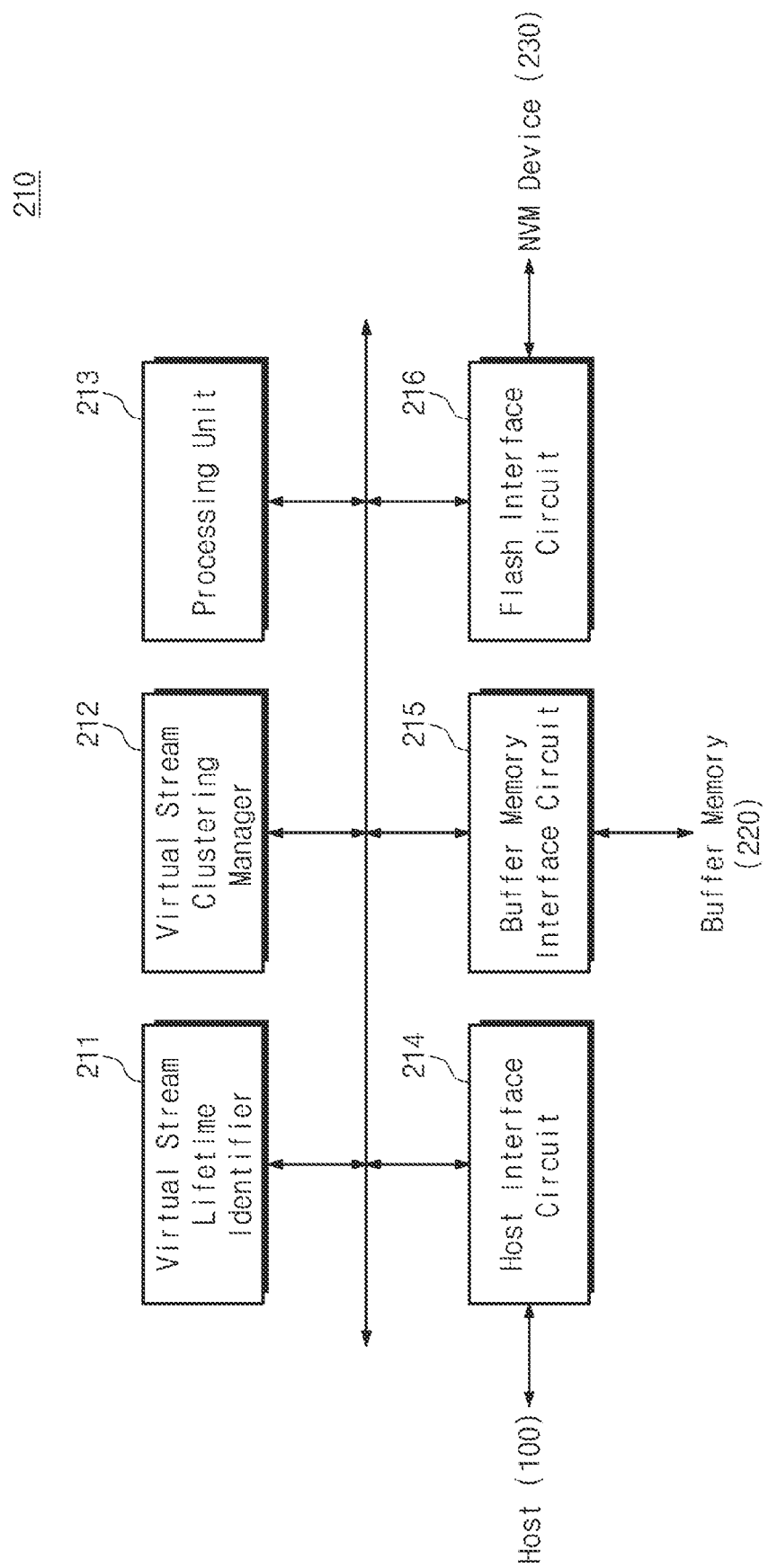
FIG. 6 is a block diagram illustrating a configuration of a controller of FIGS. 1 to 3.

FIG. 6 is a block diagram illustrating a configuration of a controller of FIGS. 1 to 3. FIG. 6 will be described with reference to FIGS. 1 to 3. The controller 210 may include the virtual stream lifetime identifier 211, the virtual stream clustering manager 212, a processing unit 213, a host interface circuit 214, a buffer memory interface circuit 215, and a flash interface circuit 216. The virtual stream lifetime identifier 211 and the virtual stream clustering manager 212 are described with reference to FIGS. 1 to 5.

The processing unit 213 may provide a variety of control information, which is needed to perform a read operation or a write operation on the nonvolatile memory device 230, to registers of the host interface circuit 214 and the flash interface circuit 216. The processing unit 213 may operate depending on firmware provided for various control operations of the controller 210. For example, the processing unit 213 may execute a flash translation layer (FTL) for performing garbage collection for managing the nonvolatile memory device 230, managing logical addresses onto physical addresses, wear leveling, etc. In an embodiment, unlike illustration of FIG. 6, the virtual stream lifetime identifier 211 and the virtual stream clustering manager 212 may be included in the processing unit 213.

The host interface circuit 214 may communicate with the host 100 depending on the above-described communication manner. For example, the host interface circuit 214 may operate in compliance with an NVMe protocol. The host interface circuit 214 may receive a write command having a virtual stream ID and a discard command having a virtual stream ID and may provide the write command and the discard command to the virtual stream lifetime identifier 211.

The buffer memory interface circuit 215 may control a read operation and a write operation of the buffer memory 220. For example, the buffer memory interface circuit 215 may provide the buffer memory 220 with the mapping table VS2LT which is generated or updated by the virtual stream lifetime identifier 211. The buffer memory interface circuit 215 may provide the mapping table VS2LT stored in the buffer memory 220 to the virtual stream lifetime identifier 211 or the nonvolatile memory device 230. The buffer memory interface circuit 215 may provide the buffer memory 220 with the mapping table VS2PS which is generated or updated by the virtual stream clustering manager 212. The buffer memory interface circuit 215 may provide the mapping table VS2PS stored in the buffer memory 220 to the virtual stream clustering manager 212 or the nonvolatile memory device 230.

The flash interface circuit 216 may exchange data with the nonvolatile memory device 230. The flash interface circuit 216 may provide the nonvolatile memory device 230 with write data to which a physical stream ID is assigned. As described above, a location of blocks of the nonvolatile memory device 230, in which first write data having a first physical stream ID are stored, is different from a location of blocks of the nonvolatile memory device 230, in which second write data having a second physical stream ID are stored. A lifetime of the first write data is not similar to a lifetime of the second write data and is different from the lifetime of the second write data.

Figure 7:
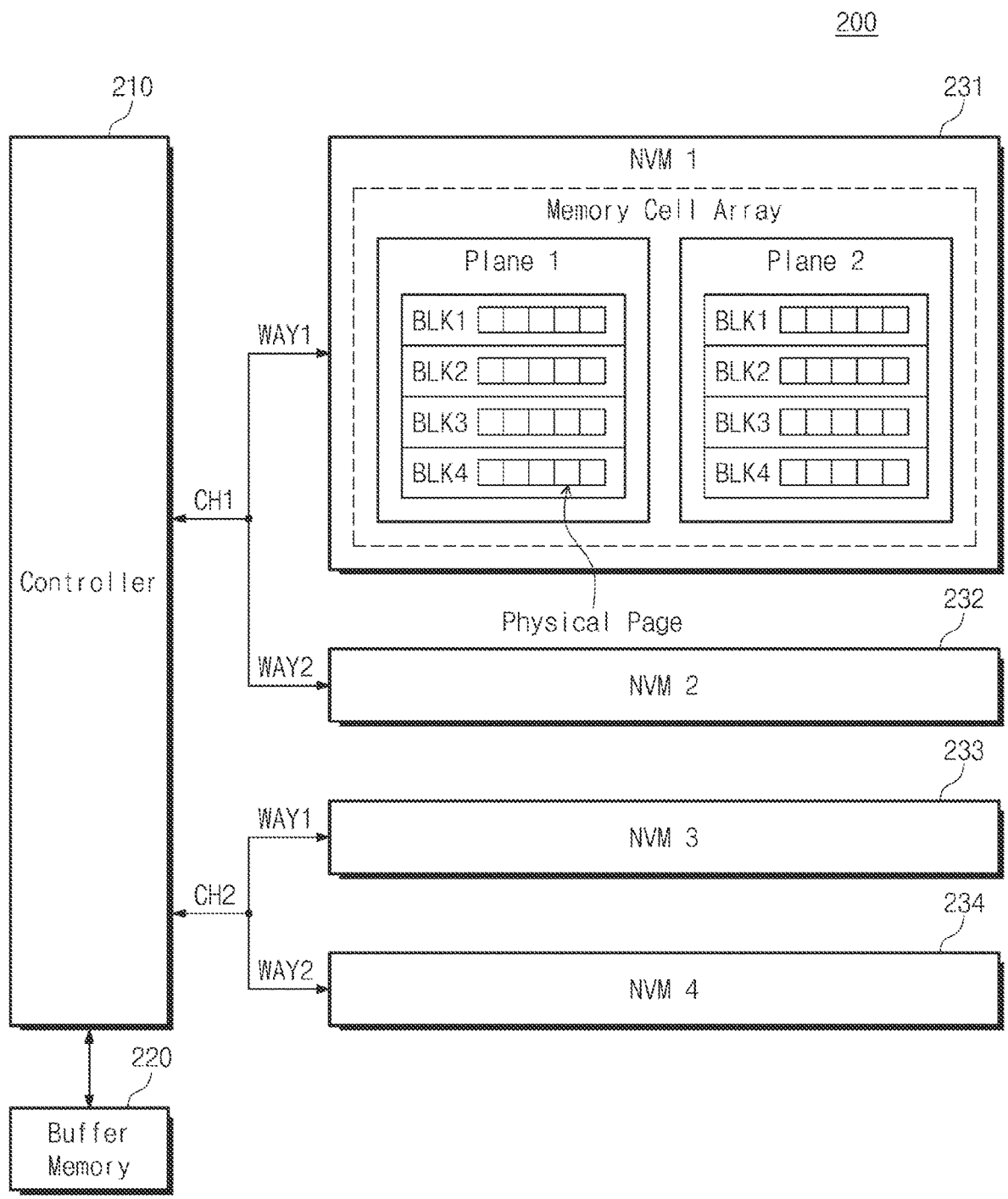
FIG. 7 is a block diagram illustrating a configuration of a storage device of FIGS. 1 to 3.

FIG. 7 is a block diagram illustrating a configuration of a storage device of FIGS. 1 to 3. The storage device 200 may include the controller 210, the buffer memory 220, and first to fourth nonvolatile memories 231 to 234. The controller 210 and the buffer memory 220 are described with reference to FIGS. 1 to 6. The first to fourth nonvolatile memories 231 to 234 may be included in the nonvolatile memory device 230 of FIGS. 1 and 2.

The controller 210 may communicate with the first to fourth nonvolatile memories 231 to 234 through the first and second channels CH1 and CH2. First and second ways WAY1 and WAY2 may be connected to each of the first and second channels CH1 and CH2. The first nonvolatile memory 231 may be connected to the first way WAY1 of the first channel CH1. Any other nonvolatile memories may be connected to any other ways in the same manner as described above. The first to fourth nonvolatile memories 231 to 234 connected to the first and second ways WAY1 and WAY2 of the first and second channels CH1 and CH2 may be identical to each other. Here, the number of channels, the number of ways, and the number of nonvolatile memories connected to a way are not limited to the example illustrated in FIG. 7.

The first nonvolatile memory 231 may include first and second planes Plane1 and Plane2 of a memory cell array. The first and second planes Plane1 and Plane2 may be identical to each other, and each of the first and second planes Plane1 and Plane2 may include first to fourth memory blocks BLK1 to BLK4. The first to fourth memory blocks BLK1 to BLK4 may be identical to each other, and each of the first to fourth memory blocks BLK1 to BLK4 may include a plurality of physical pages. Each of the plurality of physical pages may include memory cells. Here, the number of planes, the number of blocks, and the number of physical pages are not limited to the example illustrated in FIG. 7.

In an embodiment, the controller 210 may simultaneously access multiple channels, multiple ways, and multiple planes for reducing a program time. The controller 210 may simultaneously program a plurality of physical pages through the multiple channels, the multiple ways, and the multiple planes in an interleaving manner. Also, the size of the physical page may be larger than the size of the logical page above described. Accordingly, the virtual stream lifetime identifier 211 may share program times associated with simultaneously programmed logical pages, and may adjust the size of the table of the timestamps depending on the number of simultaneously programmed logical pages.

In an embodiment, the memory cell array may be a three-dimensional memory cell array. A three-dimensional memory array may be monolithically formed in one or more physical level(s) of a memory cell array having an active area arranged on a circuit related on a silicon substrate and an operation of memory cells. The circuit associated with an operation of memory cells may be located in a substrate or on the substrate. The term "monolithic" means that layers of each level of the array are directly deposited on the layers of each underlying level of the array.

The 3D memory array may include vertical NAND strings that are vertically oriented such that at least one memory cell is located over another memory cell. The at least one memory cell may comprise a charge trap layer. Each vertical NAND string may include at least one selection transistor located over memory cells. At least one selection transistor may have the same structure as memory cells, and be monolithically formed together with memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

In an embodiment, each of the memory cells of the three-dimensional memory cell array may store multiple bits (e.g., two bits (a most significant bit (MSB) and a least significant bit (LSB)) or three bits (an MSB, a center significant bit (CSB), and an LSB)). In the case of the three-dimensional memory cell array, the controller 210 may simultaneously program logical pages (e.g., an MSB page, a CSB page, and an LSB page) respectively corresponding to multiple bits (i.e., one-shot program). The one-shot program may be performed in the three-dimensional memory cell array having a coupling-free vertical structure which may reduce a cell-to-cell program interface. The virtual stream lifetime identifier 211 may further adjust the size of the table of the timestamps depending on the number of bits which a memory cell stores.

Figure 8:
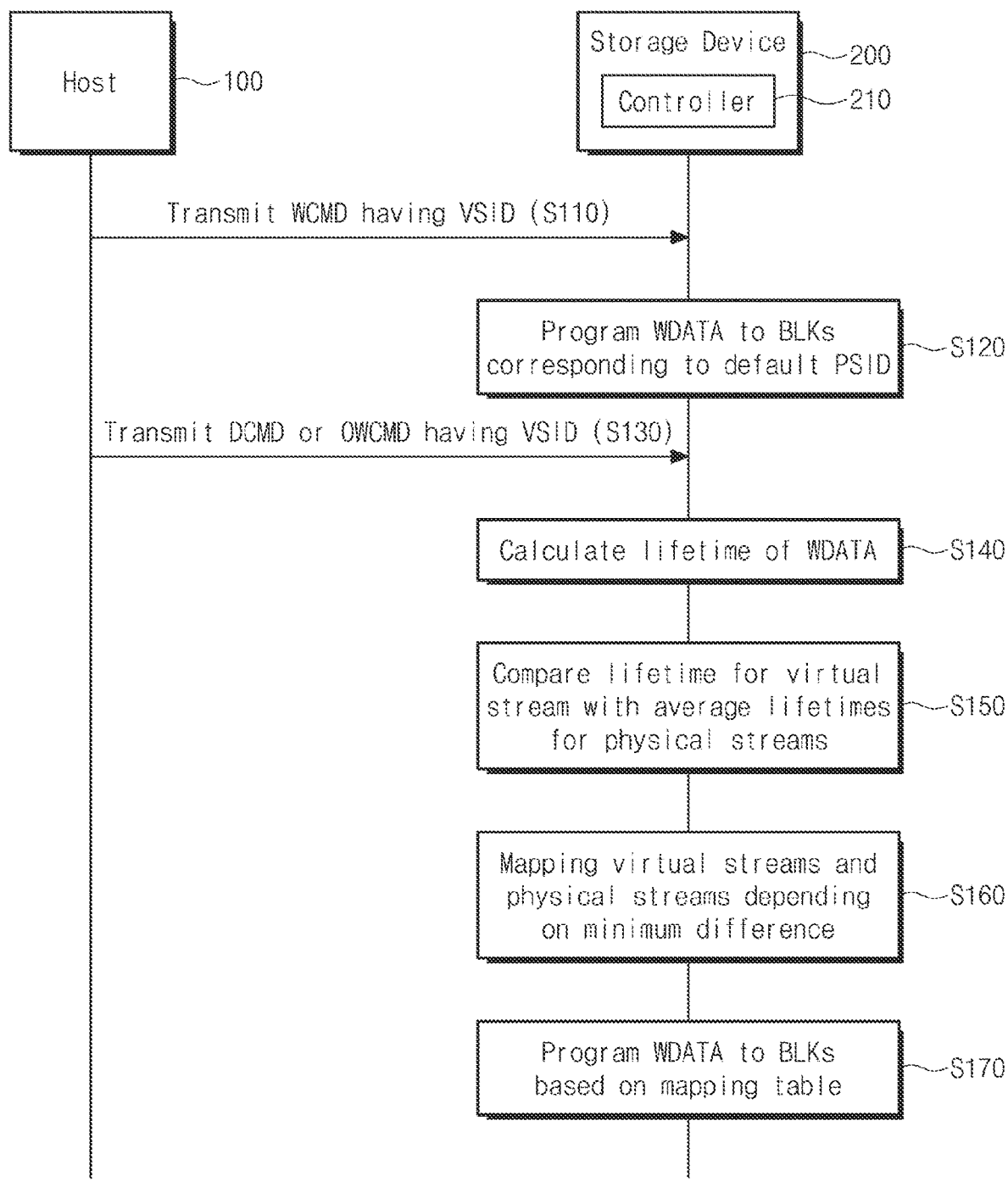
FIG. 8 is a flowchart illustrating an operating method of a storage device according to an embodiment of the disclosure.

FIG. 8 is a flowchart illustrating an operating method of a storage device according to an embodiment of the disclosure.

In operation S110, the host 100 may transmit a write command having a virtual stream ID to the storage device 200. The host 100 may assign a virtual stream ID to write data depending on a type of data, regardless of the number of physical streams which the storage device 200 supports. Of course, the host 100 may further transmit a write command having the virtual stream ID of operation S110 or any other virtual stream ID to the storage device 200.

In operation S120, the controller 210 may program the write data to blocks corresponding to a default physical stream ID in response to the write command. The program operation of operation S120 may be performed before virtual streams are mapped onto physical streams, by the virtual stream clustering manager 212. The program operation of operation S120 may be performed regardless of the mapping table VS2PS. Here, the blocks corresponding to the default physical stream ID may be periodically or randomly changed depending on a mapping table indicating a relationship between logical addresses and physical addresses.

In operation S130, the host 100 may transmit a discard command having the virtual stream ID or an overwrite command having the virtual stream ID VSID to the storage device 200. The host 100 may include a virtual stream ID in a write command or may include the virtual stream ID in a discard command. In an embodiment, operation S110 to operation S130 may be repeatedly performed during a reference time, and the order in which operation S110 to operation S130 are performed is not limited to the example illustrated in FIG. 8. As described above, the reference time may be a period in which the controller 210 updates the mapping table VS2PS.

In operation S140, the controller 210 may determine a lifetime of write data to which the virtual stream ID VSID is assigned, based on write commands and discard commands. The controller 210 may calculate a difference between an invalid time at which the discard command or the overwrite command is received in operation S130 and a program time at which the write data are programmed to the blocks corresponding to the default physical stream ID, as the lifetime of the write data.

In an embodiment, the controller 210 may not calculate respective program times at which logical pages corresponding to the write data are programmed. As described above, the logical pages may be simultaneously programmed depending on channels, ways, blocks, a ratio of the size of a physical page to the size of a logical page, and the number of bits which a memory cell of a three-dimensional memory cell array stores. The controller 210 may calculate and store only one program time at which logical pages programmed are programmed simultaneously. Afterwards, the controller 210 may calculate the lifetime of the write data.

In an embodiment, the controller 210 may calculate an average of invalid times at which logical pages corresponding to a logical address range included in the discard command or the overwrite command are invalidated. That is, the controller 210 may calculate invalid times of dead pages, which are specified by the discard command or the overwrite command, from among all logical pages of the write data to which the virtual stream ID is assigned, and an average of the invalid times. The controller 210 may not calculate lifetimes of live pages of the logical pages of the write data, to which the virtual stream ID is assigned, except for the dead pages.

In operation S150, the controller 210 may compare the lifetime calculated in operation S140, that is, the lifetime of a virtual stream with average lifetimes of physical streams. The controller 210 may calculate differences between the life time of the virtual stream and lifetimes of physical streams.

In operation S160, the controller 210 may map virtual streams onto physical streams depending on the smallest difference of the differences calculated in operation S150. That is, the controller 210 may map virtual streams onto physical streams such that a difference between the lifetime of the virtual stream and the lifetime of the physical stream mapped onto the virtual stream is the smallest. As such, write data having the same or similar lifetime in a write data set to which virtual stream IDs are assigned may be mapped onto or assigned to the same physical stream.

In operation S170, the controller 210 may program the write data to blocks corresponding to the physical stream ID, based on the mapping table VS2PS generated in operation S160. The controller 210 may perform garbage collection on write data or may program the write data to the nonvolatile memory device 230 in response to a write command. For example, operation S170 may be performed by the garbage collection, or may be performed when the write data are programmed to the nonvolatile memory device 230.

Figure 9:
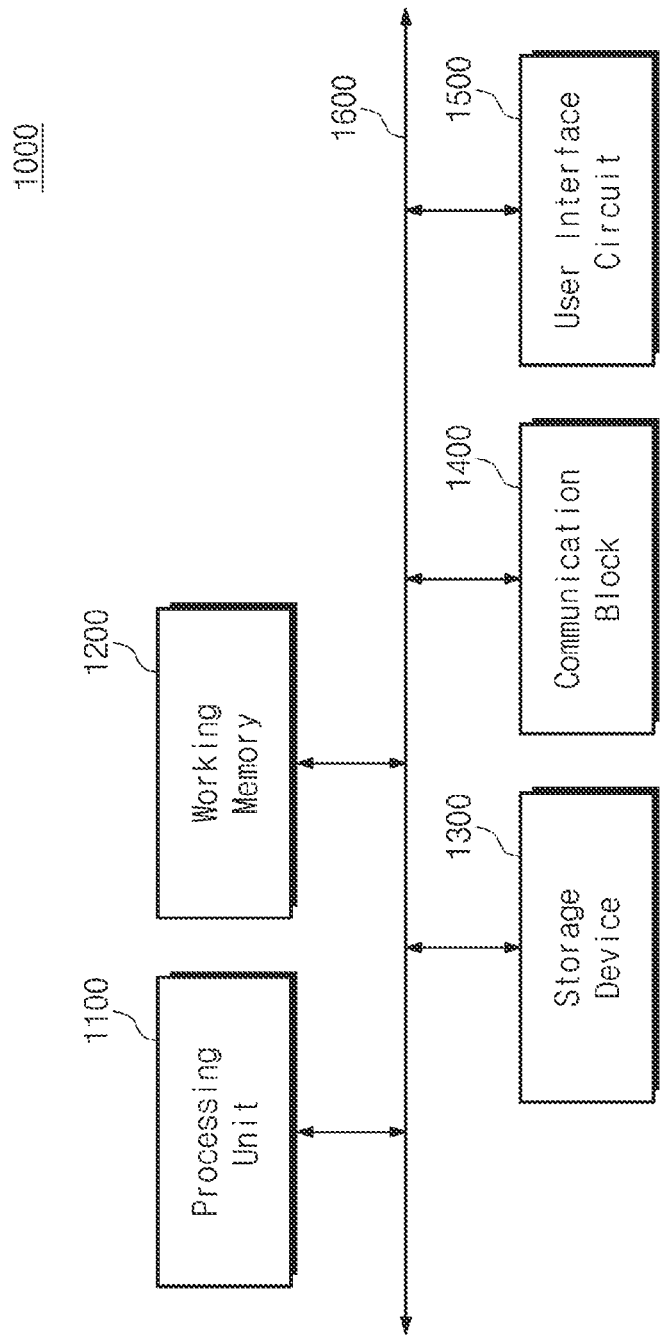
FIG. 9 is a block diagram illustrating an electronic device including a storage device according to an embodiment of the disclosure.

FIG. 9 is a block diagram illustrating an electronic device including a storage device according to an embodiment of the disclosure. An electronic device 1000 may include a processing unit 1100, a working memory 1200, a storage device 1300, a communication block 1400, a user interface circuit 1500, and a bus 1600. For example, the electronic device 1000 may be one of a personal computer, a workstation, a notebook, a tablet, a smartphone, and a mobile device.

The processing unit 1100 may control overall operations of the electronic device 1000. The processing unit 1100 may perform various kinds of arithmetic operations and/or logical operations. For example, the processing unit 1100 may include a general-purpose processor, a special-purpose processor, or an application processor.

The working memory 1200 may exchange data with the processing unit 1100. The working memory 1200 may temporarily store data which are used for an operation of the electronic device 1000. The working memory 1200 may be used as a buffer memory of the electronic device 1000. For example, the working memory 1200 may include a volatile memory system such as an SRAM or a DRAM. The working memory 1200 may include one or more memory modules or one or more memory packages.

The storage device 1300 may store data which need to be retained regardless of power supply. For example, the storage device 1300 may include a storage medium such as a solid state drive (SSD).

The storage device 1300 may be implemented based on at least one of the embodiments of the disclosure described with reference to FIGS. 1 to 9. The storage device 1300 may include a controller which maps virtual stream IDs onto physical stream IDs based on a lifetime of data. To this end, the storage device 1300 may receive write commands having virtual stream IDs and discard commands having virtual stream IDs. According to an embodiment of the disclosure, the performance of garbage collection of the storage device 1300 may be improved, and the shortening of the lifetime of the storage device 1300 may slow down.

The communication block 1400 may communicate with the outside of the electronic device 1000 under control of the processing unit 1100. The communication block 1400 may communicate with the outside of the electronic device 1000 in compliance with a wired communication protocol and/or a wireless communication protocol. For example, the communication block 1400 may communicate with the outside of the electronic device 1000 in compliance with at least one of various wireless communication protocols, such as long term evolution (LTE), world interoperability for microwave access (WiMax), global system for mobile communications (GSM), code division multiple access (CDMA), Bluetooth, near field communication (NFC), wireless fidelity (Wi-Fi), and radio frequency identification (RFID), and/or at least one of various wired communication protocols, such as transfer control protocol/internet protocol (TCP/IP), universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), and firewire.

The user interface circuit 1500 may perform communication mediation between a user and the electronic device 1000 under control of the processing unit 1100. For example, the user interface circuit 1500 may include an input interface such as a keyboard, a mouse, a keypad, a button, a touch panel, a touch screen, a touch pad, a touch ball, a camera, a microphone, a gyroscope sensor, or a vibration sensor. In addition, the user interface circuit 1500 may include an output interface such as a liquid crystal display (LCD) device, a light emitting diode (LED) display device, an organic LED (OLED) display device, an active matrix OLED (AMOLED) display device, a speaker, and a motor.

The bus 1600 may provide a communication path between the components of the electronic device 1000. The components of the electronic device 1000 may exchange data with each other based on a bus format of the bus 1600. For example, the bus format may include one or more of various protocols such as USB, SCSI, PCIe, ATA, PATA, SATA, SAS, IDE, and universal flash storage (UFS).

A storage device according to an embodiment of the disclosure may map virtual streams onto physical streams based on a lifetime of data and may store the data. Accordingly, the efficiency of garbage collection of the storage device may be improved. Also, the portability or compatibility of a host communicating with the storage device may be improved.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. An operating method of a storage device, the method comprising:
receiving write commands having virtual stream identifiers (IDs) from a host;
receiving discard commands having the virtual stream IDs from the host;
allocating a lifetime of write data to which each of the virtual stream IDs is assigned, based on the write commands and the discard commands;

mapping at least two virtual stream IDs among the virtual stream IDs onto one of physical stream IDs based on the lifetime of the write data allocated by the storage device; and programming the write data to blocks which correspond to one of the physical stream IDs of nonvolatile memories, based on a mapping table indicating a relationship of the virtual stream IDs and the physical stream IDs, wherein:

the discard commands indicate that data stored in the storage device are invalid, a number of the virtual stream IDs which the host assigns is greater than a number of the physical stream IDs which the storage device assigns, and the mapping the virtual stream IDs onto the physical stream IDs includes:

calculating differences between the lifetime of the write data and lifetimes of a block data set to which the physical stream IDs are assigned; and mapping the virtual stream IDs onto the physical stream IDs depending on a smallest difference of the differences.

2. The method of claim 1, wherein the allocating of the lifetime of the write data includes:

calculating a program time at which the write data are programmed to blocks, which correspond to a default physical stream ID of the physical stream IDs, of the nonvolatile memories regardless of the mapping table; and calculating, as the lifetime of the write data, a difference between: (1) a time of receiving: (a) a discard command associated with the write data of the discard commands or (b) an overwrite command associated with the write data of the write commands and (2) the program time.

3. The method of claim 1, wherein a first difference between the lifetime of the write data and a lifetime of first block data to which the one of the physical stream IDs is assigned is smaller than a second difference between the lifetime of the write data and a lifetime of second block data to which another of the physical stream IDs is assigned.

4. The method of claim 1, wherein the programming of the write data to the blocks of the nonvolatile memories includes performing garbage collection on the nonvolatile memories, based on the mapping table.

5. A storage device comprising:

a controller that:

receives write commands having virtual stream identifiers (IDs), receives discard commands having the virtual stream IDs, and allocates a lifetime of write data to which each of the virtual stream IDs is assigned based on the write commands and the discard commands; and nonvolatile memories accessed by the controller depending on physical stream IDs, wherein:

the controller maps at least two virtual stream IDs among the virtual stream IDs onto one of the physical stream IDs based on the lifetime of the write data allocated by the controller, the discard commands indicate that data stored in the storage device are invalid, a number of the virtual stream IDs which an external host assigns is greater than a number of the physical stream IDs which the controller assigns, and the controller includes:

a virtual stream lifetime identifier that calculates, as a first lifetime of first write data, a difference between: (1) a time at which the controller receives: (a) a first discard command having a first virtual stream ID among the virtual stream IDs or (b) a first overwrite command having the first virtual stream ID and (2) a time at which the first write data, to which the first virtual stream ID is assigned, are programmed to the nonvolatile memories; and a virtual stream clustering manager that:

compares the first lifetime of the first write data with a lifetime of block data to which each of the physical stream IDs is assigned, and maps the first virtual stream ID onto a first physical stream ID of the physical stream IDs based on a result of comparing the first lifetime with the lifetime of the block data.

6. The storage device of claim 5, wherein:

the virtual stream lifetime identifier calculates, as a second lifetime of second write data, a difference between: (3) a time at which the controller receives: (c) a second discard command having a second virtual stream ID of the virtual stream IDs or (d) a second overwrite command having the second virtual stream ID and (4) a time at which second write data, to which the second virtual stream ID is assigned, are programmed to the nonvolatile memories, and the virtual stream clustering manager:

compares the second lifetime of the second write data with the lifetime of the block data to which the physical stream IDs are respectively assigned, and maps the second virtual stream ID onto the first physical stream ID or maps the second virtual stream ID onto a second physical stream ID of the physical stream IDs based on a result of comparing the second lifetime and the lifetime of the block data.

7. The storage device of claim 6, wherein the virtual stream clustering manager:

maps the second virtual stream ID onto the first physical stream ID and clusters the second write data, the first write data, and first block data to which the first physical stream ID is assigned, or maps the second virtual stream ID onto the second physical stream ID and clusters the second write data and second block data to which the second physical stream ID is assigned.

8. The storage device of claim 7, wherein the virtual stream clustering manager:

maps the second virtual stream ID onto the first physical stream ID when a difference between a lifetime of the first block data and the second lifetime of the second write data is smaller than a difference between a lifetime of the second block data and the second lifetime of the second write data, or maps the second virtual stream ID onto the second physical stream ID when a difference between the lifetime of the second block data and the second lifetime of the second write data is smaller than a difference between the lifetime of the first block data and the second lifetime of the second write data.

9. The storage device of claim 5, wherein the virtual stream lifetime identifier allocates the first lifetime of the first write data by: (i) determining lifetimes of logical pages of logical addresses included in both a first write command having the first virtual stream ID and one of the first discard command and the first overwrite command and (ii) calculating an average of the lifetimes of the logical pages.

10. The storage device of claim 5, wherein the virtual stream clustering manager maps the first virtual stream ID onto the first physical stream ID whenever a reference time elapses.

11. The storage device of claim 5, further comprising:
a buffer memory that stores a table of timestamps in which lifetimes of a write data set, to which the virtual stream IDs are assigned, are recorded, wherein
the controller adjusts a size of the table of timestamps depending on: (1) a number of channels connecting the nonvolatile memories with the controller, (2) a number of ways connected to each of the channels, (3) a number of planes in each of the nonvolatile memories, or (4) a ratio of a size of a physical page in each of the nonvolatile memories to a size of a logical page.

12. The storage device of claim 11, wherein:
each of the nonvolatile memories includes a three-dimensional nonvolatile memory cell array, and
when each of memory cells of the three-dimensional nonvolatile memory cell array stores multiple bits, the controller adjusts the size of the table of timestamps depending on a number of the multiple bits.

13. A storage device comprising:
nonvolatile memories; and
a controller that accesses the nonvolatile memories depending on a first physical stream identifier (ID) and a second physical stream ID among physical stream IDs, wherein the controller:
receives write commands having virtual stream IDs;
receives discard commands having the virtual stream IDs;
allocates a lifetime of write data, to which each of the virtual stream IDs is assigned, based on the write commands and the discard commands; and
clusters the write data and one of first block data, to which the first physical stream ID is assigned, and second block data, to which the second physical stream ID is assigned, based on a first difference between: (1) the lifetime of the write data and (2) a lifetime of the first block data and a second difference between: (3) the lifetime of the write data and (4) a lifetime of the second block data, wherein:
the discard commands indicate that data stored in the storage device are invalid,
a number of the virtual stream IDs which an external host assigns is greater that a number of the physical stream IDs which the controller assigns, and
the controller maps at least two virtual stream IDs among the virtual stream IDs onto one of the physical stream IDs based on the lifetime of the write data allocated by the controller.

14. The storage device of claim 13, wherein the controller:
clusters the write data and the first block data when the first difference is smaller than the second difference; and
clusters the write data and the second block data when the second difference is smaller than the first difference.

15. The storage device of claim 13, wherein:
the controller maps each of the virtual stream IDs onto one of the first physical stream ID and the second physical stream ID, based on the first difference and the second difference, and
a number of the virtual stream IDs is not less than 2.

16. The storage device of claim 15, wherein the controller generates a mapping table indicating a relationship of the virtual stream IDs, the first physical stream ID, and the second physical stream ID.

17. The storage device of claim 13, wherein the controller allocates, as the lifetime of the write data, a difference between: (a) a time of receiving: (i) a discard command associated with the write data of the discard commands or (ii) an overwrite command associated with the write data of the write commands and (b) a time at which the write data are programmed to the nonvolatile memories.

* * * * *